July 7, 1942.   T. V. RAGSDALE, JR   2,288,646
SURFACE GRINDER
Filed Nov. 7, 1940
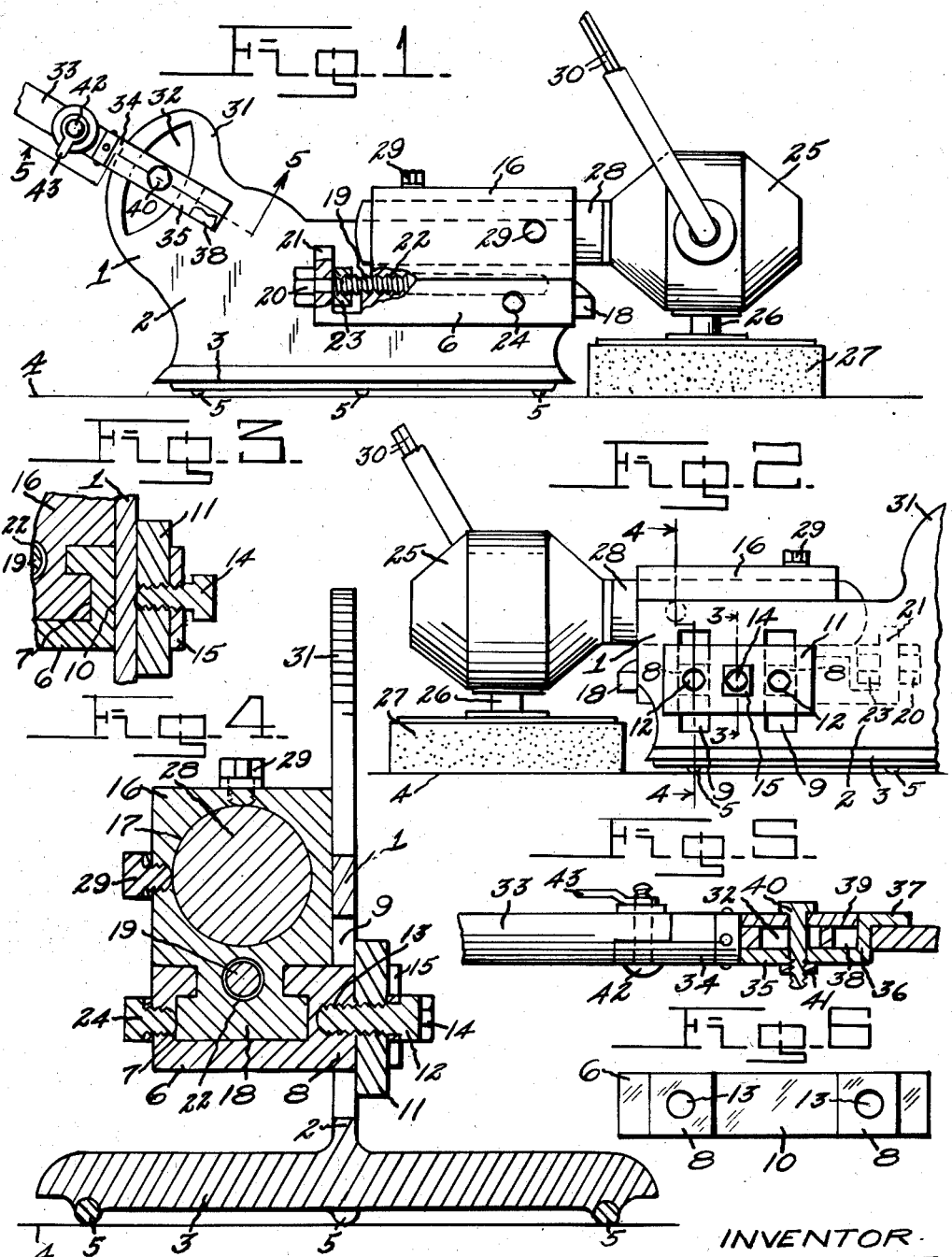
INVENTOR
Theodore V. Ragsdale Jr.
BY
Francis P. Vandermulen
ATTORNEY Patented July 7, 1942

2,288,646

UNITED STATES PATENT OFFICE 2,288,646

SURFACE GRINDER

Theodore V. Ragsdale, Jr., Los Angeles, Calif.

Application November 7, 1940, Serial No. 364,619

8 Claims. (Cl. 51—177)

(Granted under the act of March 3, 1883, as amended April 30, 1928; 370 O. G. 757)

This invention described herein may be manufactured and used by or for the Government for governmental purposes, without the payment to me of any royalty thereon.

This invention relates to a surface grinder, more particularly it is directed to a device of this character for grinding or otherwise finishing metallic and other surfaces.

One of the objects of the invention is to provide a surface grinder adapted to be readily moved over a surface by the hand and including a motor, a grinding member operated by the motor and a supporting member therefor which is adapted to hold the motor and grinding member in a fixed steady adjusted position thereon and to guide the grinding member over the surface to be ground or otherwise finished.

Another object of the invention is to provide a surface grinder which is rigid in construction, easy to operate, which will give satisfactory service over a long period of time and so designed as to reach all corners, walls and places which may be inaccessible to other surface grinders of like character.

Briefly stated, the improved surface grinder comprises a support adapted to movably seat on a surface and having a hand gripping portion thereon adapted to be grasped by the hand for moving the grinder to different positions on the surface; a guide member adjustably mounted on the support, a carrier member slidably and adjustably mounted on the guide member, means for adjustably actuating the carrier member on the guide member, and a motor operated grinder rotatably and longitudinally adjustably mounted on the carrier member, whereby the motor operated grinder may be manually moved to different points on a surface to be ground, adjusted to various positions for engagement with a work piece and held in a fixed steady position during a grinding operation. A handle extension adapted to be detachably connected to the hand gripping portion of the support to prevent the user of the device from leaning over during a grinding operation, is also provided for carrying out the invention.

With the above and other objects and advantages in view the invention consists of certain features of construction and operation of parts which will hereinafter appear and in which—

Fig. 1 is a side elevation partly in section of the improved surface grinder including a handle extension detachably connected thereto and illustrating the grinder in an operative position on a surface to be ground or otherwise finished;

Fig. 2 is a fragmentary view of the other side of the surface grinder;

Fig. 3 is an enlarged fragmentary detail section taken on the line 3—3 of Fig. 2;

Fig. 4 is an enlarged vertical sectional view taken on the line 4—4 of Fig. 2;

Fig. 5 is a fragmentary detail sectional view partly in elevation of a hand gripping portion and a portion of the handle extension detachably secured thereto; taken on the line 5—5 of Fig. 1, and, Fig. 6 is a side elevation of a guide member used in carrying out the invention.

In the illustrated embodiment characterizing the invention 1 designates a support comprising a flat vertically extending body portion 2 having a base or foot portion 3 which is adapted to lie flat on a surface 4 to be ground or otherwise finished and may be provided with ball bearings 5 mounted thereon in any suitable manner, whereby the device may be freely moved to different positions on the surface 4.

On one side of the body portion 2 of the support 1 is a guide member 6 containing an open T-shaped or undercut channel 7, as illustrated in Fig. 4, and having spaced lugs or ears 8 rectangular in cross-section projecting outwardly from one side thereof, as more particularly illustrated in Fig. 6. The guide member 6 is longitudinally arranged on the body portion 2 of the support and extends outwardly at right angles from one side thereof with the lugs 8 projecting into spaced vertically extending elongated apertures 9 provided in the body portion 2 of the support and with the inner side portion 10 of the guide member intermediate the lugs 8, abutting against a portion of the surface of the body portion 2 between the apertures 9, as illustrated in Fig. 3.

The guide member 6 is vertically adjustably mounted on the body portion 2 of the support by means of an elongated rectangular shaped side plate 11 carrying spaced set screws 12 which are adapted to threadably engage at their inner ends in threaded holes or wells 13 formed in the free ends of the lugs 8 of the guide member. The side plate 11 also carries a set screw 14 at its central portion which is adapted to abut at its inner end against the outer surface of the body portion on the opposite side thereof from the guide member, as illustrated in Fig. 3. By tightening up on the set screw 14 the side plate 11 is forced from the side of the body portion of the support thereby causing the side plate to more securely hold the guide member in its adjusted position against the body portion. A washer 15 or the like may be provided on the screw 14. The guide member 6 is adapted to slidably support a longitudinally extending carrier member 16 which is substantially rectangular shaped in cross section and having a longitudinally extending bore 17 formed therein and a downwardly extending portion 18 which is adapted to engage in the T-shaped or undercut channel 7 formed in the guide member 6.

The carrier member 16 is adapted to be moved longitudinally on the guide member 6 by means of an elongated adjusting screw 19 which is rotatably secured at its head 20, as illustrated in Fig. 1 in an upwardly extending base portion 21 provided on the rear end of the guide member 6. The free end of the adjusting screw 19 projects into and threadably engages a threaded opening 22 longitudinally formed in the lower portion of the carrier member. By turning the head 20 of the adjusting screw 19 in either direction with a wrench or the like, the threads on the adjusting screw engaging with the threads of the opening 22 in the carrier member will cause the carrier member to be moved longitudinally forward or backward on the guide member. In order to lock the screw 19 in an adjusted position, a lock nut 23 is threadably mounted on the screw at the opposite side of the base portion 21 from the head 20 of the screw and to hold the carrier member 16 in an adjusted position on the guide member 6, a set screw 24 is provided which is threadably mounted on the guide member and adapted to contact with the carrier member at its inner end.

A motor 25 having a grinder shaft 26 containing a grinding member 27 on its outer end is longitudinally and rotatably adjustably mounted on the carrier member 16 by means of a horizontally extending arm or shaft 28 fixedly mounted on one side of the motor. The arm or shaft 28 extends from the motor at a right angle to the grinder shaft 26 and is adapted to rotatably and longitudinally engage in the bore 17 of the carrier member. Set screws 29 arranged at suitable points on the carrier member 16 are provided which are adapted to contact at their inner ends with the outer peripheral surface of the arm 28 of the motor whereby the motor 25 and grinding member 27 may be locked in an adjusted position on the carrier member. The motor 25 is preferably of the electric type and has feed wires or conductors 30 leading to a suitable source of electrical supply (not shown) and the grinding member 27 is illustrated as an emery stone for removing high spots in a metallic or other surface.

The upper rear end of the body portion 2 of the support is provided with a hand gripping portion 31 including a finger engaging slot 32 whereby the device may be grasped by the hand to direct the grinding member 27 to different positions on the surface to be ground.

To prevent the user of the device when desired from leaning over to move it to different positions over a piece of work, a handle extension 33 is provided which may be detachably secured to the hand gripping portion 31 on the support 1, as illustrated in Fig. 1. The handle extension 33 is provided with an end portion 34 having a projection 35 thereon preferably of metal, which is adapted to engage a portion of one side of the hand gripping portion 31 and bent at its free end to provide a portion 36 at a right angle to the body of the projection and a portion 37 at a right angle to the portion 36 so that it may be inserted in an opening or slot 38 provided on the hand gripping portion 31 on the body portion 2 of the support with the portion 36 abutting against the inner edge of the slot 38 and the portion 37 abutting against the other side of the hand gripping portion 31 from the body of projection 35. The end portion 34 of the handle extension 33 is detachably held in place on the hand gripping portion 31 of the support by means of a plate 39, preferably of metal, which is positioned on the opposite side of the hand gripping portion from the projection 35 and held in place thereon by a bolt 40 which extends through the finger engaging slot 32 on the hand gripping portion and bolted to the projection 35 by a nut 41, as illustrated in Fig. 5. This end portion 34 of the handle extension 33 extends upwardly at an angle from the hand gripping portion 31 and is detachably connected at its outer end to the inner end of the handle extension by the bolt 42 and hand lever 43.

In using the surface grinder on the surface 4 and assuming that current is turned on into the electrical motor 25 from the source of electrical supply (not shown) through the conductors 30, the motor will turn the grinder shaft which in turn will revolve the grinding member 27 at a high rate of speed over the surface 4 whereby the surface is ground down to an even surface or otherwise finished. When it is necessary to move the surface grinder to a different point or should a high point on the surface 4 be encountered, the set screw 14 on the side plate 11 is unscrewed an amount to release the outward pressure on the side plate and the set screws 12 on the side plate are unscrewed from the threaded holes 13 in the lugs 8 of the guide member 6, an amount to permit the guide member to be raised by the hands in a vertical or perpendicular direction with the lugs 8 on the guide member sliding in the vertical extending apertures 9 in the body portion 2 of the support, whereby the carrier member 16, the motor 25 and grinding member 27 mounted thereon are also raised to the required height in a vertical or perpendicular direction. The set screws 12 and the screw 14 on the side plate 11 are then tightened up by a wrench, or the like and the surface grinder moved to the proper position by grasping the hand gripping portion 31 on the body portion 2 of the support or by means of the handle extension 33 where the set screws 12 and the screw 14 are again unscrewed to permit the guide member 6, the carrier member 16, the motor 25 and grinding member 27 to be moved downwardly and thus permit the grinding member to again contact with the surface, in which case the set screws 12 and the screw 14 are again tightened.

Should it be desired to grind a surface which is not horizontal the guide member 6 and the parts supported thereon are again raised to a predetermined height and the set screws 29 on the carrier member are unscrewed to free the arm 28 on the motor 25 therefrom, whereby the motor and grinding member may be rotated in either a clockwise or counterclockwise direction on the carrier member 16 any amount necessary to engage the particular surface to be ground. After the motor and grinding member have been rotated a predetermined amount on the carrier member the set screws 29 are again tightened to hold the motor and grinding member in their adjusted position. To move the carrier member 16, carrying the motor 25 and the grinding member 27 in a forward or rearward direction on the support 1 the adjusting scew 19 on the guide member 6 is actuated as above described.

It will thus be seen that there is herein provided a novel and efficient form of surface grinder which is well adapted for all the purposes indicated. Even though there has been herein shown and described certain features of construction and operation of parts, it is nevertheless to be understood that various changes may be made therein if the changes do not depart from the claims.

Having described my invention, what I claim as new and wish to secure by Letters Patent is:

1. In a surface grinder, the combination of a support including a base portion and a body portion, apertures formed in said body portion, a guide member cooperating with said apertures and adjustably mounted vertically on the body portion, a carrier member slidably mounted on said guide member and a motor operated grinder adjustably mounted on said carrier member.

2. In a surface grinder, the combination of a support including a base portion and a body portion, apertures formed in said body portion, a guide member cooperating with said apertures and adjustably mounted vertically on the body portion, a carrier member slidably mounted on the guide member, means for slidably actuating the carrier member on said guide member and a motor grinder unit adjustably mounted on said carrier member.

3. In a surface grinder, the combination of a support including a base portion and a body portion, apertures formed in said body portion, a guide member having a channel formed therein, said guide member cooperating with said apertures and adjustably mounted vertically on the body portion, a carrier member including a portion slidably mounted in the channel of said guide member and a motor grinder unit slidably and rotatably mounted on said carrier member.

4. In a surface grinder, the combination of a support including a base portion and a body portion, apertures formed in said body portion, a guide member cooperating with said apertures and adjustably mounted vertically on the body portion, a carrier member slidably mounted on said guide member, a motor including means longitudinally and rotatably mounted on said carrier member and a grinding member actuated by said motor.

5. In a surface grinder, the combination of a support including a base portion and a body portion having a hand gripping portion provided thereon, apertures formed in said body portion, a guide member cooperating with said apertures and adjustably mounted on said body portion, a carrier member slidably mounted on the guide member, a motor, a fixed shaft on said motor longitudinally and rotatably mounted on said carrier member and a grinding member actuated by said motor.

6. In a surface grinder, the combination of a support including a base portion and a body portion having a hand gripping portion thereon, apertures formed in said body portion, a guide member cooperating with said apertures and adjustably mounted on the body portion, a carrier member slidably mounted on the guide member, a motor grinder unit rotatably and longitudinally adjusted mounted on said carrier member and a handle extension detachably connected to the hand gripping portion of said body portion.

7. In a surface grinder, the combination of a support including a base portion and a body portion, apertures formed in said body portion, a guide member cooperating with said apertures and adjustably mounted on the body portion, a carrier member containing a bore slidably and adjusably mounted on said guide member, a motor, a fixed arm projecting from said motor, said arm longitudinally and rotatably mounted in the bore of said carrier member, a grinder shaft operated by said motor, and a grinding member mounted on said grinder shaft, said grinder shaft being at a right angle to the fixed arm on said motor.

8. In a surface grinder, the combination of a support including a base portion and a body portion containing vertically extending apertures, a guide member having lugs projecting outwardly therefrom, vertically adjustable on the body portion, said lugs on the guide member slidably mounted in the apertures in the body member, a side plate adjustably bolted to the lugs on the guide member, a carrier member slidably and adjustably mounted on the guide member, means for adjustably actuating the carrier member on said guide member, and a motor grinder unit longitudinally and rotatably adjustably mounted on said carrier member.

THEODORE V. RAGSDALE, Jr.